(12) United States Patent
Ito et al.

(10) Patent No.: US 8,976,818 B2
(45) Date of Patent: Mar. 10, 2015

(54) COMMUNICATION DEVICE, A CONTROL DEVICE, AND A NON-TRANSITORY COMPUTER READABLE MEDIUM

(71) Applicants: Masashi Ito, Kanagawa-ken (JP); Yasuyuki Kozakai, Kanagawa-ken (JP)

(72) Inventors: Masashi Ito, Kanagawa-ken (JP); Yasuyuki Kozakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 13/724,135

(22) Filed: Dec. 21, 2012

(65) Prior Publication Data

US 2013/0322456 A1    Dec. 5, 2013

(30) Foreign Application Priority Data

Jun. 4, 2012   (JP) ................. 2012-127545

(51) Int. Cl.
*H04J 3/06* (2006.01)
*H04J 3/00* (2006.01)
*H04L 7/04* (2006.01)

(52) U.S. Cl.
CPC ............. *H04L 7/04* (2013.01); *H04J 3/0667* (2013.01)
USPC ............ 370/519; 370/508; 370/412; 370/429

(58) Field of Classification Search
USPC .............. 370/395.1, 473, 508, 519, 412, 429, 370/472
See application file for complete search history.

(56) References Cited

U.S. PATENT DOCUMENTS

| | | | |
|---|---|---|---|
| 6,370,163 B1* | 4/2002 | Shaffer et al. | 370/519 |
| 2003/0031185 A1* | 2/2003 | Kikuchi et al. | 370/400 |
| 2008/0089364 A1* | 4/2008 | Barry et al. | 370/517 |

FOREIGN PATENT DOCUMENTS

JP   2007-158425   6/2007

* cited by examiner

*Primary Examiner* — Benjamin H Elliott, IV
(74) *Attorney, Agent, or Firm* — Amin, Turocy & Watson, LLP

(57) ABSTRACT

A communication device transmits a first packet to a first device via a network device, and receives a second packet from the first device. A transmission time between the communication device and the first device is calculated using time indicated by the communication device when the communication device transmitted the first packet, time indicated by the first device when the first device received the first packet, time indicated by the first device when the first device transmitted the second packet, time indicated by the communication device when the communication device received the second packet. A size of the first packet is set so that wait time of the first packet at the network device is within predetermined period. The wait time is calculated by assuming that a third packet transmitted from a second device is inputted to the network device before the first packet is inputted to the network device.

16 Claims, 14 Drawing Sheets

COMMUNICATION DEVICE, A CONTROL
DEVICE, AND A NON-TRANSITORY
COMPUTER READABLE MEDIUM

CROSS-REFERENCE TO RELATED
APPLICATION

This application is based upon and claims the benefit of priority from Japanese Patent Application No. 2012-127545, filed on Jun. 4, 2012; the entire contents of which are incorporated herein by reference.

FIELD

Embodiments described herein relate generally to a communication device, a control device, and a non-transitory computer readable medium.

BACKGROUND

As conventional technique, a time synchronization system including a time synchronization client and a time synchronization server exists. The time synchronization server provides a high precision reference time. The time synchronization client communicates with the time synchronization server via a network, and synchronizes a local time thereof with the reference time.

In this system, when a packet for synchronization (For example, a synchronization request packet and a synchronization reply packet) is made a round trip between the time synchronization client and the time synchronization server, the time synchronization client calculates a round trip time 2d of the packet.

When the packet for synchronization is made a round trip between the time synchronization client and the time synchronization server, if a network delay time of the packet on an outward way from the time synchronization client to the time synchronization server is equal to a network delay time of the packet on a return way from the time synchronization server to the time synchronization client, a local time of the time synchronization client can be synchronized with "(reference time of the time synchronization server)+(round trip time (2d)÷2)".

On the other hand, if a network delay time of the synchronization request packet is not equal to a network delay time of the synchronization reply packet, a local time (of the time synchronization client) calculated by above-mentioned equation includes an error. Briefly, even if the round trip time is simply divided by two, this division result is not equal to a transmission time of one way.

Accordingly, in order to preciously synchronize the local time with the reference time, when the packet for synchronization is made a round trip between the time synchronization client and the time synchronization server, a network delay time of the synchronization request packet had better be equal to a network delay time of the synchronization replay packet as much as possible.

In this system, the time synchronization client and the time synchronization server communicate via a general network device (For example, IP router/switch). Accordingly, in the network device, the packet for synchronization and other packets are mixed. Briefly, on the network, a first another device (except for the time synchronization client and the time synchronization server) transmits/receives another packet (different from the packet for synchronization) with a second another device via the network device. Here, transmission/receiving of another packet are often performed at the same time of transmission/receiving of the packet for synchronization.

In this way, at the network device on a communication path between the time synchronization client and the time synchronization server, when the packet for synchronization (transmitted by the time synchronization client) competes with another packet (transmitted by another device), this case becomes the reason why a network delay time of the synchronization request packet is not equal to a network delay time of the synchronization reply packet.

Especially, in transmission of store and forward type used by the network device, until transmission of a packet (being outputted) is completed, transmission of a next packet cannot be started. Accordingly, if another packet (transmitted by another device) is inputted to the network device before the packet for synchronization (transmitted by the time synchronization client) is inputted to the network device, the packet for synchronization is outputted from the network device after waiting output of another packet. As a result, at the network device, a wait time to transmit the packet for synchronization occurs. In this case, for example, if the wait time occurs at transmission of the packet on an outward way from the time synchronization client to the time synchronization server, and if the wait time does not occur at transmission of the packet on a return way from the time synchronization server to the time synchronization client, a difference of the transmission time between the outward way and the return way occurs. Furthermore, if the wait time of the outward way is different from the wait time of the return way, the difference of the transmission time between the outward way and the return way also occurs.

In conventional technique, in order to avoid occurrence of the wait time at the network device, the time synchronization client transmits the packet for synchronization by shifting from a timing when another device transmits another packet.

However, in this technique, when traffic of the network becomes large, i.e., when another device frequently transmits another packet, occurrence of the wait time at the network device cannot be avoided.

DETAILED DESCRIPTION

According to one embodiment, a communication device communicates with a first device via a network device. The communication device includes a setting unit, a generation unit, a transmission unit, a receiving unit, and a processing unit. The setting unit is configured to set a size of a first packet. The generation unit is configured to generate the first packet having the size. The transmission unit is configured to transmit the first packet to the first device. The receiving unit is configured to receive a second packet from the first device. The processing unit is configured to calculate a transmission time of the first packet or the second packet between the communication device and the first device, by using a time indicated by the communication device when the transmission unit has transmitted the first packet, a time indicated by the first device when the first device has received the first packet, a time indicated by the first device when the first device has transmitted the second packet, and a time indicated by the communication device when the receiving unit has received the second packet. The setting unit sets the size of the first packet so that a wait time of the first packet at the network device is within a predetermined period. The wait time is calculated by assuming that a third packet transmitted from a second device is inputted to the network device before the first packet is inputted to the network device.

Various embodiments will be described hereinafter with reference to the accompanying drawings. Moreover, in each drawing, as to same units, the same sign is assigned, and explanation thereof is omitted.

(The First Embodiment)

Figure 1:
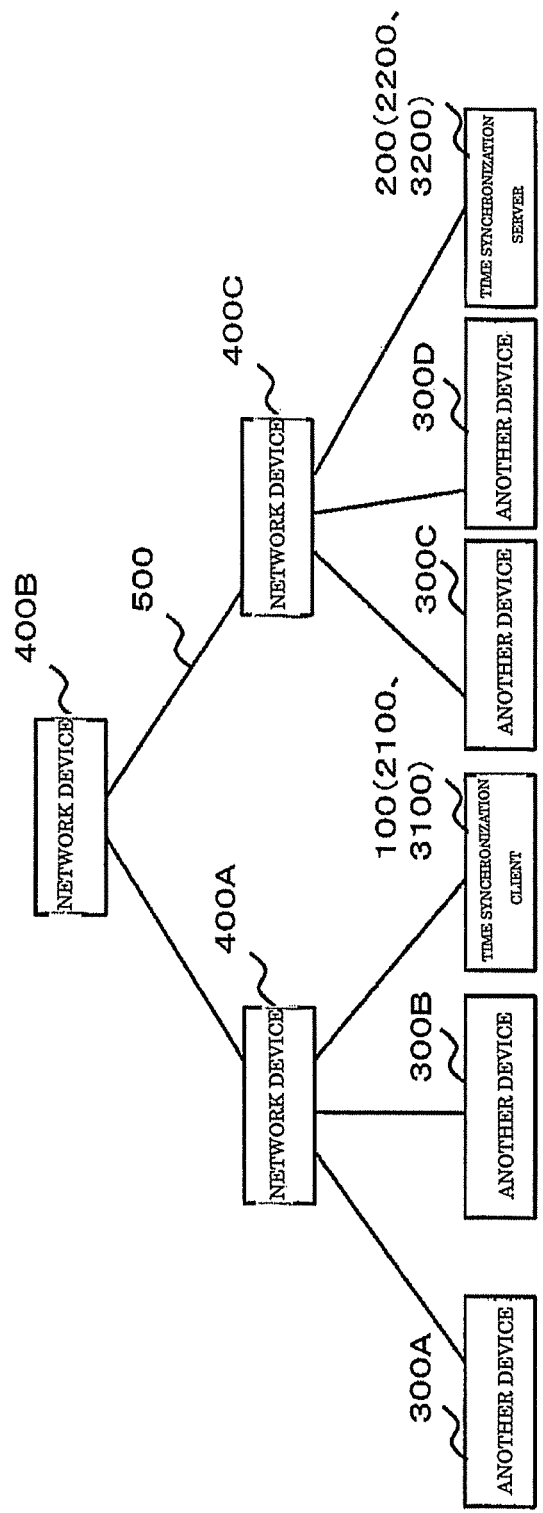
FIG. 1 is a block diagram of a communication system according to a first embodiment.

FIG. 1 is a block diagram of a communication system according to the first embodiment.

In FIG. 1, the communication system includes a time synchronization client 100 having a local time and a time synchronization server 200 providing a high precision reference time. The time synchronization client 100 communicates with the time synchronization server 200 via network devices 400A, 400B, 400C and a network 500, and synchronizes the local time with the reference time. Furthermore, the communication system includes other devices 300A~300D. The other devices 300A~300D transmits/receives packets via the network devices 400A, 400B, 400C and the network 500. Moreover, other devices 300A~300D are different from the time synchronization client 100 and the time synchronization server 200. In order to distinct the other devices 300A~300D therefrom, each device 300A~300D is called another device. Another device 300A~300D is a device to regularly communicate data. Network devices 400A~400C are devices to transfer packets transmitted/received by time synchronization client 100, the time synchronization server 200, and another device 300A~300D. Briefly, the network devices 400A~400C have routing function. For example, IP router/switch had better be applied. For example, if the network 500 is a complicated network, the network device can certainly deliver a packet (transmitted from the time synchronization client 100) to the time synchronization server 200.

Figure 2:
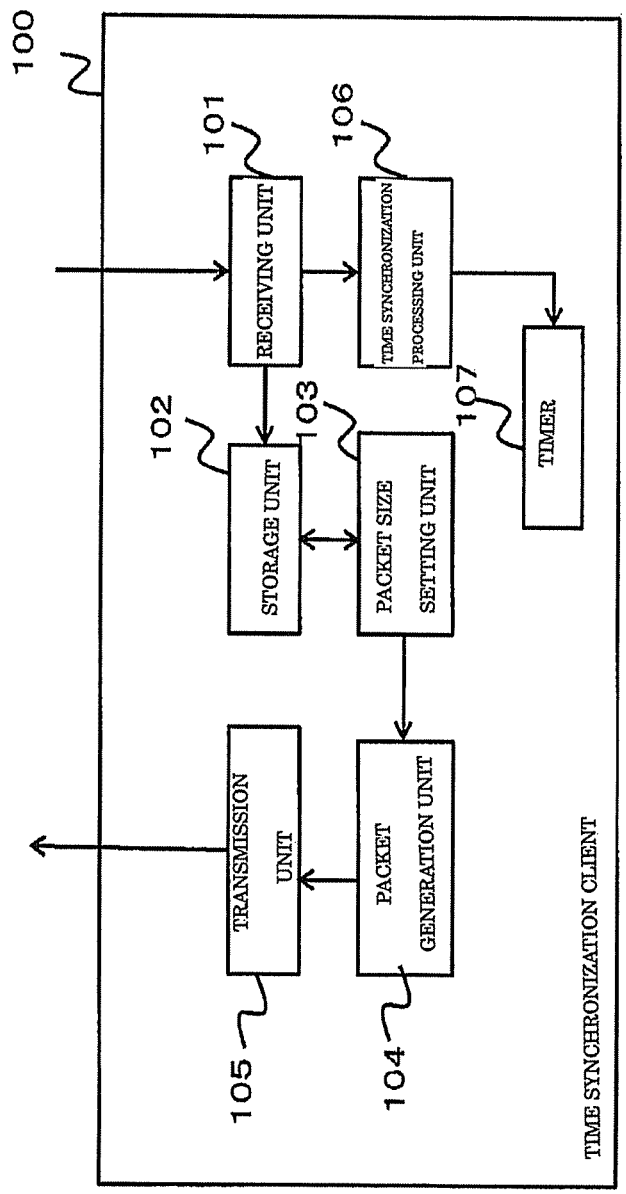
FIG. 2 is a block diagram of a time synchronization client 100 in FIG. 1.

FIG. 2 is a block diagram of the time synchronization client 100 according to the first embodiment.

The time synchronization client 100 includes a receiving unit 101, a storage unit 102, a packet size setting unit 103, a packet generation unit 104, a transmission unit 105, a time synchronization processing unit 106, and a timer 107.

The transmission unit 105 transmits a synchronization request packet. The synchronization request packet is a packet to request a synchronization reply packet of the time synchronization server 200. By receiving the synchronization reply packet, the time synchronization client 100 can synchronize the local time thereof with a high precision reference time of the time synchronization server 200. Detail of the synchronization method will be explained afterwards. For example, the synchronization request packet is a packet including a time stamp (time t1 thereof) at timing when the synchronization request packet is transmitted.

The storage unit 102 stores a part of information necessary to determine a size of the synchronization request packet. As an example of the information, a maximum of size of packets (except for the synchronization request packet and the synchronization reply packet) transmitted in the communication system of FIG. 1, the number of network devices in the communication system, a system component (connection relationship) among the network device, another device, and the time synchronization client and the time synchronization server, and a band of each link of the network 500, are stored. By using these information, the packet size setting unit 103 calculates an equation (6) (with a method explained afterwards), and determines a size of the synchronization request packet. Moreover, the storage unit 102 may previously store a condition equation (such as the equation (6)) to determine the size of the synchronization request packet. In this case, by using the condition equation, the packet size setting unit 103 can determine the size of the synchronization request packet. Moreover, a maximum of a size of packets except for the synchronization request packet and the synchronization reply packet may be previously determined by a network manager. Alternatively, the network device 400B may measure size of packets (except for the synchronization request packet and the synchronization reply packet) passing through for a predetermined period, and select the maximum of size therefrom. Furthermore, information necessary to determine a size of the synchronization request packet may be the size itself thereof.

The packet size setting unit 103 determines a size of the synchronization request packet by using information of the storage unit 102. A method for determining the size will be explained afterwards.

The packet generation unit 104 generates a synchronization request packet of which size is same as the size indicated by the packet size setting unit 103 and including a time stamp t1.

On the other hand, the receiving unit 101 receives a synchronization reply packet via the network device 400A.

The time synchronization processing unit 106 calculates a synchronization time so as to synchronize the timer 107 with the reference time of the time synchronization server 200, based on information of the synchronization reply packet received. More specifically, the synchronization reply packet includes a time stamp t1 indicated by the timer 107 when the time synchronization client 100 transmits a synchronization request packet, a time stamp t2 indicated by a timer 207 when the time synchronization server 200 receives the synchronization request packet, a time stamp t3 by indicated the timer 207 when the time synchronization server 200 transmits a synchronization reply packet, and a time stamp t4 indicated by the timer 107 when the time synchronization client 100 receives the synchronization replay packet. By using this information, the time synchronization processing unit 106 calculates the synchronization time by following equation.

Synchronization time=(a time stamp $t3$ indicated by the timer 207 when the time synchronization server 200 transmits a synchronization reply packet)+(a period(called "one way delay")from a time when the time synchronization server 200 transmits the synchronization reply packet to a time when the time synchronization client 100 receives the synchronization reply packet) (1)

Furthermore, if a network delay time of a packet along an outward way is equal to a network delay time of the packet along a return way between the time synchronization client 100 and the time synchronization server 200, one way delay is represented by following equation.

One way delay=$\{(t4-t3)+(t2-t1)\}/2$ (2)

Accordingly, the synchronization time is represented by following equation.

Synchronization time=$t3+\{(t4-t3)+(t2-t1)\}/2$ (3)

By the equation (3), the time synchronization processing unit 106 calculates the synchronization time using time stamps t1~t4.

The timer 107 ticks a local time. The local time is set to the synchronization time calculated by the time synchronization processing unit 106, and synchronized with a timer 207 (having a high precision reference time) of the time synchronization server 200.

Figure 3:
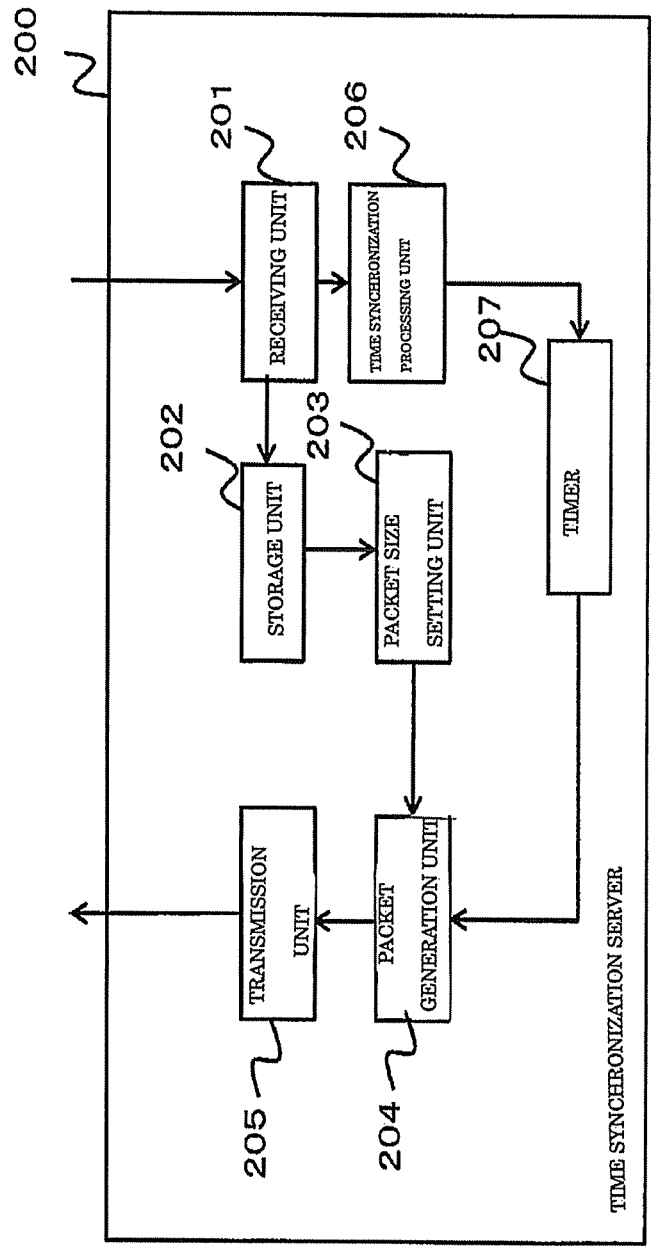
FIG. 3 is a block diagram of a time synchronization server 200 in FIG. 1.

FIG. 3 is a block diagram of the time synchronization server 200.

The time synchronization server 200 includes a receiving unit 201, a storage unit 202, a packet size setting unit 203, a packet generation unit 204, a transmission unit 205, a time synchronization processing unit 206, and a timer 207.

The receiving unit 201 receives a synchronization request packet.

The storage unit 202 stores a part of information necessary to determine a size of the synchronization reply packet. As an example of the information, a maximum of size of packets (except for the synchronization request packet and the synchronization reply packet) transmitted in the communication system of FIG. 1, the number of network devices in the communication system, a system component (connection relationship) among the network device, another device, and the time synchronization client and the time synchronization server, and a band of each link of the network 500, are stored. By using these information, the packet size setting unit 203 calculates an equation (6) (with a method explained afterwards), and determines a size of the synchronization reply packet. Moreover, the storage unit 202 may previously store a condition equation (such as the equation (6)) to determine the size of the synchronization reply packet. In this case, by using the condition equation, the packet size setting unit 203 can determine the size of the synchronization reply packet. Furthermore, information necessary to determine a size of the synchronization reply packet may be the size itself thereof.

The packet size setting unit 203 determines a size of the synchronization reply packet by using information of the storage unit 202. A method for determining the size will be explained afterwards.

The packet generation unit 204 generates a synchronization reply packet of which size is same as the size indicated by the packet size setting unit 203.

The transmission unit 205 transmits the synchronization reply packet generated by the packet generation unit 204. The synchronization reply packet includes information (a time stamp t1 indicated by the timer 107 when the time synchronization client 100 has transmitted the synchronization request packet, a time stamp t2 indicated by the timer 207 when the time synchronization server 200 has received the synchronization request packet, a time stamp t3 indicated by the timer 207 when the time synchronization server 200 has transmits the synchronization reply packet).

The timer 207 ticks a high precision reference time.

The time synchronization processing unit 206 notifies the present time indicated by the timer 207 via the packet generation unit 204 and the transmission unit 205. More specifically, the time synchronization processing unit 206 makes the packet generation unit 204 generate a packet including the present time (indicated by the timer 207) as a time stamp t3 when the synchronization reply packet is transmitted, and makes the transmission unit 205 transmit this packet. As a result, the time synchronization processing unit 206 notifies the present time indicated by the timer 207.

Figure 4:
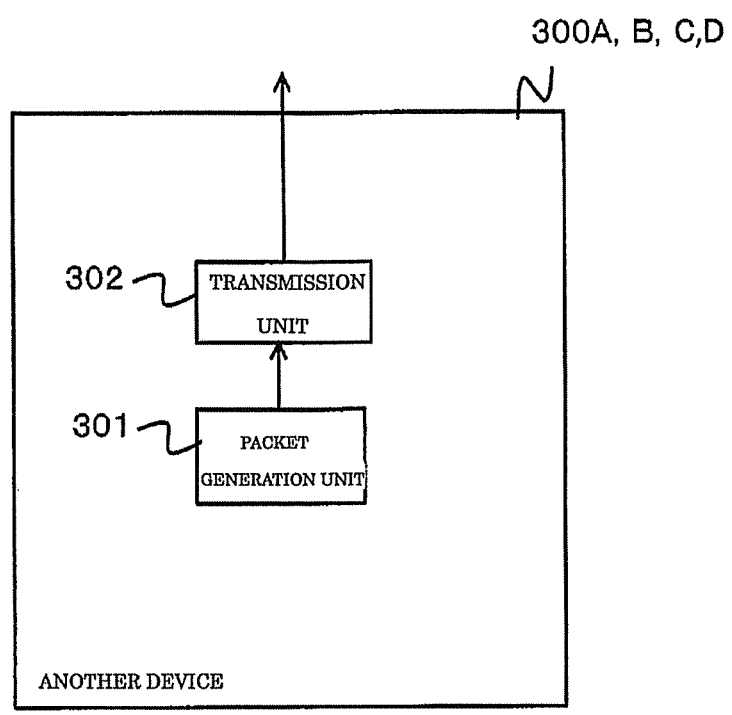
FIG. 4 is a block diagram of another device 300A, 300B, 300C and 300D in FIG. 1.

FIG. 4 is a block diagram showing component of another device 300A~300D.

The another device 300A~300D includes at least a packet generation unit 301 to generate a packet and a transmission unit 302 to transmit the packet.

Next, processing of the time synchronization client 100 is explained.

Figure 5:
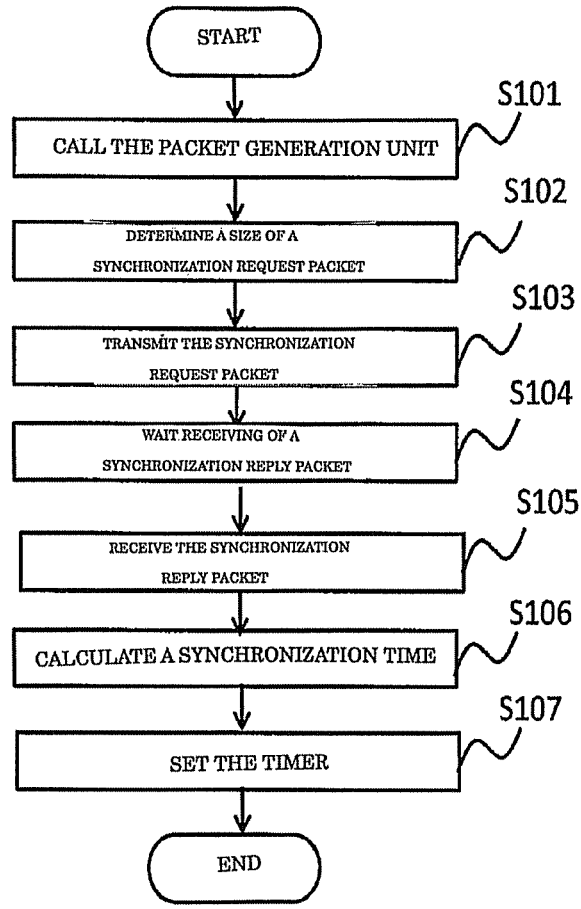
FIG. 5 is a flow chart of processing of the time synchronization client 100 of FIG. 2.

FIG. 5 is a flow chart of synchronization processing of the time synchronization client 100.

First, the timer 107 calls the packet generation unit 104 at a timing (periodically, or a user's indication timing) when the time synchronization client 100 synchronizes a time thereof with the time synchronization server 200 (S101).

Next, the packet generation unit 104 calls the packet size setting unit 103, and makes the packet size setting unit 103 set a size of packet (S102). A method for setting the size will be explained afterwards. After that, the packet generation unit 104 generates a synchronization request packet having the size.

After the packet generation unit 104 generates the synchronization request packet having the size, the transmission unit 105 transmits the synchronization request packet (S103). The synchronization request packet includes a time stamp t1 indicating a transmission time of the synchronization request packet.

After the transmission unit 105 transmits the synchronization request packet, the receiving unit 101 waits receiving of a synchronization reply packet (S104).

After that, the receiving unit 101 receives the synchronization reply packet (S105).

After receiving the synchronization reply packet, the receiving unit 101 calls the time synchronization processing unit 106. By using time stamps t1, t2, t3 and t4 acquired by transmission of the synchronization receiving packet and receiving of the synchronization reply packet, the time synchronization processing unit 106 calculates one way delay by the equation (2). Next, the time synchronization processing unit 106 calculates a synchronization time (the present time of the timer 207) by the equation (3) (S106). The time synchronization processing unit 106 sets the synchronization time to the present time of the timer 107, and completes synchronization processing (S107).

Next, processing to set the size of synchronization request packet at S102 by the packet size setting unit 103 is explained. Moreover, the packet size setting unit 103 may set the size by acquiring information necessary to determine the size from the storage unit 102, or may set the size by arbitrarily calculating the information. Moreover, as mentioned above, the information stored in the storage unit 102 includes a maximum of size of packets (except for the synchronization request packet and the synchronization reply packet) transmitted in the communication system of FIG. 1, the number of network devices in the communication system, a system component (connection relationship) among the network device, another device, and the time synchronization client and the time synchronization server, and a band of each link of the network 500. Moreover, the storage unit 102 may previously store a condition equation such as an equation (6). By calculating the condition equation such as the equation (6) or by using the condition equation previously stored in the storage unit 102, the packet size setting unit 103 determines a size of packet.

In the communication system of FIG. 1, another device 300A and 300B respectively execute transmission/receiving with another device 300C and 300D. In this communication system, a maximum of the size of packet transmitted/received by another device 300A, 300B, 300C and 300D is M byte, and a size of the synchronization request packet is L byte. Furthermore, a band of each link of the network 500 is 100 Mbps. In the communication system of FIG. 1, delay (occurred by influence of packets transmitted/received by another device 300A~300D) to forward the synchronization request packet from the time synchronization client 100 to the time synchronization server 20 is represented by an equation (4). In the equation (4), "8" is multiplied to convert the unit from byte to bit. More, the equation (4) is satisfied in case of M>L. In case M<L of, delay to transmit the packet is M*8/100,000,000 as a value irrespective of L. Hereinafter, the case of M>L is explained. As to the case of M <L, the equation (4) is replaced with M*8/100,000,000.

$$M*8/100,000,000+(M-1)*8/100,000,000 \quad (4)$$

Hereinafter, the equation (4) will be explained.

[As to Wait Time at the Network Device 400A]

In the equation (4), M*8/100,000,000 is a maximum time that the synchronization request packet is waited by a packet having size M in a queue (not shown in Fig.) of the network device 400A. Briefly, if a timing when a packet transmitted by any of another device 300A and 300B is inputted to the network device 400A is immediately before a timing when the synchronization request packet transmitted by the time synchronization client 100 is inputted to the network device 400A, it is a time that the synchronization request packet is waited in a queue of the network device 400A.

[As to Wait Time at the Network Device 400B]

Furthermore, (M−L)*8/100,000,000 is a maximum time that the synchronization request packet is waited by a packet having size M in a queue (not shown in Fig.) of the network device 400B. Briefly, if a timing when a packet transmitted by any of another device 300A and 300B is inputted to the network device 400B is immediately before a timing when the synchronization request packet transmitted by the time synchronization client 100 is inputted to the network device 400B, it is a time that the synchronization request packet is waited in a queue of the network device 400B.

The reason why the time to wait in a queue of the network device 400B is (M−L)*100,000,000 is explained in detail. Under above-mentioned condition, when the synchronization request packet arrives at the network device 400B, transmission of a previous packet is already started. Furthermore, priority of transmission order thereof is not controlled. Accordingly, the synchronization request packet is waited as delay "M*8/100,000,000" in the queue. On the other hand, if the previous packet transmitted by another device 300A or 300B is not included in the queue, the synchronization request packet is transferred with delay "L*8/100,000,000. Accordingly, by influence of packets transmitted by another device 300A or 300B, a maximum time that the synchronization request packet is waited in the queue of the network device 400B is (M−L)*8/100,000,000.

[As to Wait Time at the Network Device 400C]

When the time synchronization client 100 transmits a synchronization request packet to the time synchronization server 200, a wait time does not occur at the network device 400C. As shown in FIG. 1, the network device 400C has a plurality of outputs. Accordingly, the synchronization request packet and packets transmitted by another device 300A or 300B, can be outputted in parallel from the network device 400C. This is the reason that the wait time does not occur.

As above-explained, delay of transmission of the synchronization request packet (having size L) from the time synchronization client 100 to the time synchronization server 200 is occurred by influence of packets (having size M) transmitted by another device 300A or 300B. This delay is represented by the equation (4).

Here, as mentioned-above, if a network delay time of a packet along an outward way is equal to a network delay time of the packet along a return way between the time synchronization client 100 and the time synchronization server 200, one way delay from a transmission time by the time synchronization server 200 to a receiving time by the time synchronization client 100 is represented by the equation (4). Accordingly, as to an error between a network delay time calculated by the equation (2) and an actual network delay time, in transmission of packet between the time synchronization client 100 and the time synchronization server 200, when a maximum wait time occurs along the outward way and a wait time does not occur along the return way or when a wait time does not occur along the outward way and a maximum wait time occurs along the return way, a maximum error occurs.

Then, by using the equation (4), the maximum error of one way is represented as follows.

$$\{M*8/100,000,000+(M-L)*8/100,000,000\}/2 \quad (5)$$

In the equation (5), a permissible time error is set to X. In this case, a size of packet for synchronization is represented as L satisfying a condition of equation (6).

$$X>\{M*8/100,000,000+(M-L)*8/100,000,000\}/2 \quad (6)$$

Thus far, the method for determining a size of the synchronization request packet is already explained.

Moreover, in above-mentioned example, a condition (equation (6)) to determine the size of the synchronization request packet is explained. Furthermore, among a plurality of L satisfying the equation (6), the method for selecting which L variously exists. For example, L may be determined as "L=M". As a result, the delay can be the shortest. On the other hand, if L is smaller, the packet size is also smaller. Accordingly, compression of the network band can be reduced.

Moreover, in above-mentioned example, a method for the time synchronization client 100 to determine the size of the time synchronization request packet is explained. However, in the same way as this method, the time synchronization server 200 can determine the size of the time synchronization request packet.

Furthermore, the time synchronization client 100 and the time synchronization server 200 may respectively determine each size of the time synchronization request packet and the time synchronization reply packet. However, the time synchronization client 100 and the time synchronization server 200 may determine by using the size of packet transmitted by any thereof. For example, the time synchronization server 200 may determine a size of the time synchronization reply packet as the same size as the time synchronization request packet received thereby.

As mentioned-above, as to the time synchronization client 100 and the time synchronization server 200 of the first embodiment, each size of the synchronization request packet and the synchronization reply packet is determined so that an error between a network delay time of the synchronization request packet from the time synchronization client 100 to the time synchronization server 200 and a network delay time of the synchronization reply packet from the time synchronization server 200 to the time synchronization client 100 is minimized (within a predetermined time). Accordingly, one way delay (represented by the equation (2)) can be near an actual transmission time of one way. As a result, the error of time synchronization can be within a minimum range.

Moreover, in the first embodiment, the communication system shown in FIG. 1 is already explained as one example. However, a component of the communication system of the first embodiment is not limited to this example of FIG. 1. Based on the component of the communication system, a wait time occurred by influence of the network device is variously represented by an equation different from the equation (4). Based on this equation, the equations (5) and (6) become different equations respectively. If the network device has a plurality of inputs and one output, as explained with the equation (4), for example, the wait time is represented as M*8/100,000,000. If the network device has one input and one output, for example, the wait time is represented as (M−L)*8/100,000,000. If the network device has one input and a plurality of outputs, the wait time is 0 (zero). Then, based on the number of inputs and the number of outputs in each network device, by calculating a sum of the wait time of each network device, the wait time of the communication system can be calculated.

Moreover, in the first embodiment, the case that a band of each link is 100 Mbps is already explained as the example. However, the band is not limited to this example. Based on the band of each link, the value "100,000,000" in the equation (4) is varied.

Furthermore, in the first embodiment, first, the time synchronization client 100 transmits a synchronization request packet to the time synchronization server 200. After receiving the synchronization request packet, the time synchronization server 200 transmits a synchronization reply packet as a response thereof. However, transmission procedure is not limited to this example. For example, the time synchronization client 100 and the time synchronization server 200 may respectively transmit a packet for synchronization at the same timing. In this case, a time when the time synchronization client 100 transmits a packet for synchronization is t1', a time when the time synchronization client 100 receives a packet for synchronization from the time synchronization server 200 is t2', a time when the time synchronization server 200 transmits the packet is t3', and a time when the time synchronization server 200 receives the packet from the time synchronization client 100 is t4'. A synchronization time and one way delay are represented by following equations (3') and (4').

$$\text{time difference} = \{(t4'-t1')-(t2'-t3')\}/2 \tag{2'}$$

$$\text{synchronization time} = t4' - (\text{time difference}) \tag{3'}$$

$$\text{one way delay} = (\text{synchronization time}) - t3' \tag{4'}$$

In this way, equations to calculate the synchronization time and one way delay are not limited to the equation (2)

Moreover, if the synchronization time and one way delay are calculated by using the equations (3') and (4), in order to correctly calculate solutions, a difference between a network delay time of one way from the time synchronization client 100 to the time synchronization server 200 and a network delay time of one way from the time synchronization server 200 to the time synchronization client 100 had better be as small as possible. In this case, the method for determining a size of the synchronization request packet is same as the method explained in the first embodiment.

<The Second Embodiment>

Next, the second embodiment is explained.

As to a time synchronization client 2100 and a time synchronization server 2200 of the second embodiment, a method for determining each size of a synchronization request packet and a synchronization reply packet is different from the time synchronization client 100 and the time synchronization server 200 of the first embodiment. Other processing thereof is same as the first embodiment.

Component of a communication system of the second embodiment is shown in FIG. 1.

Figure 6:
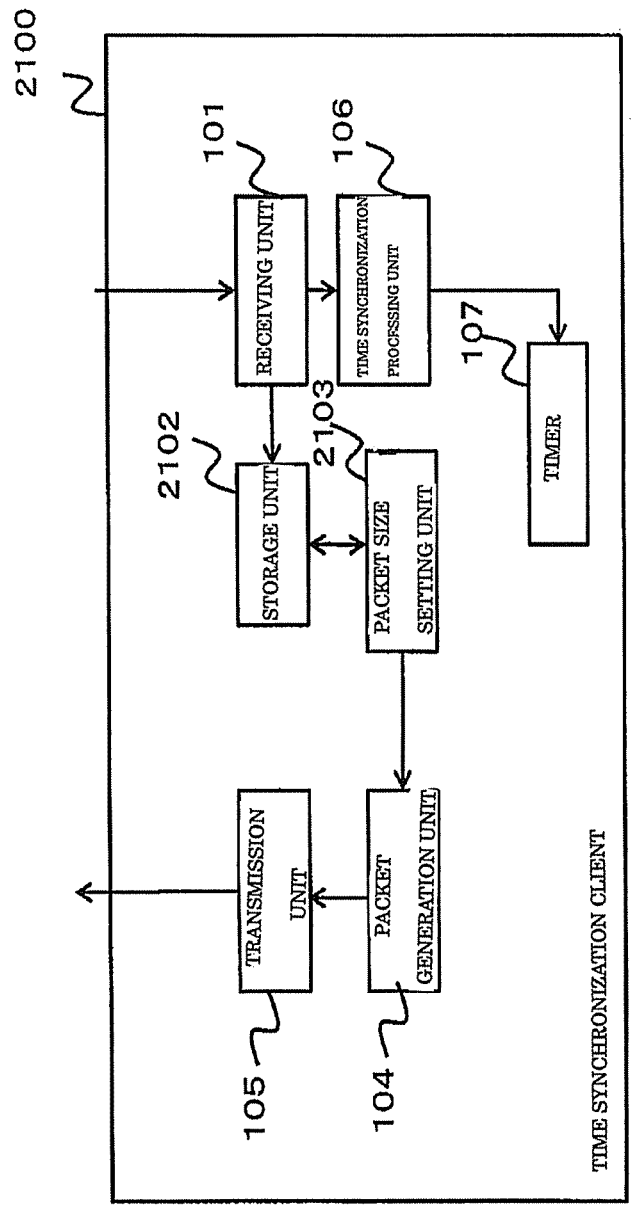
FIG. 6 is a block diagram of a time synchronization client 2100 according to a second embodiment.
Figure 7:
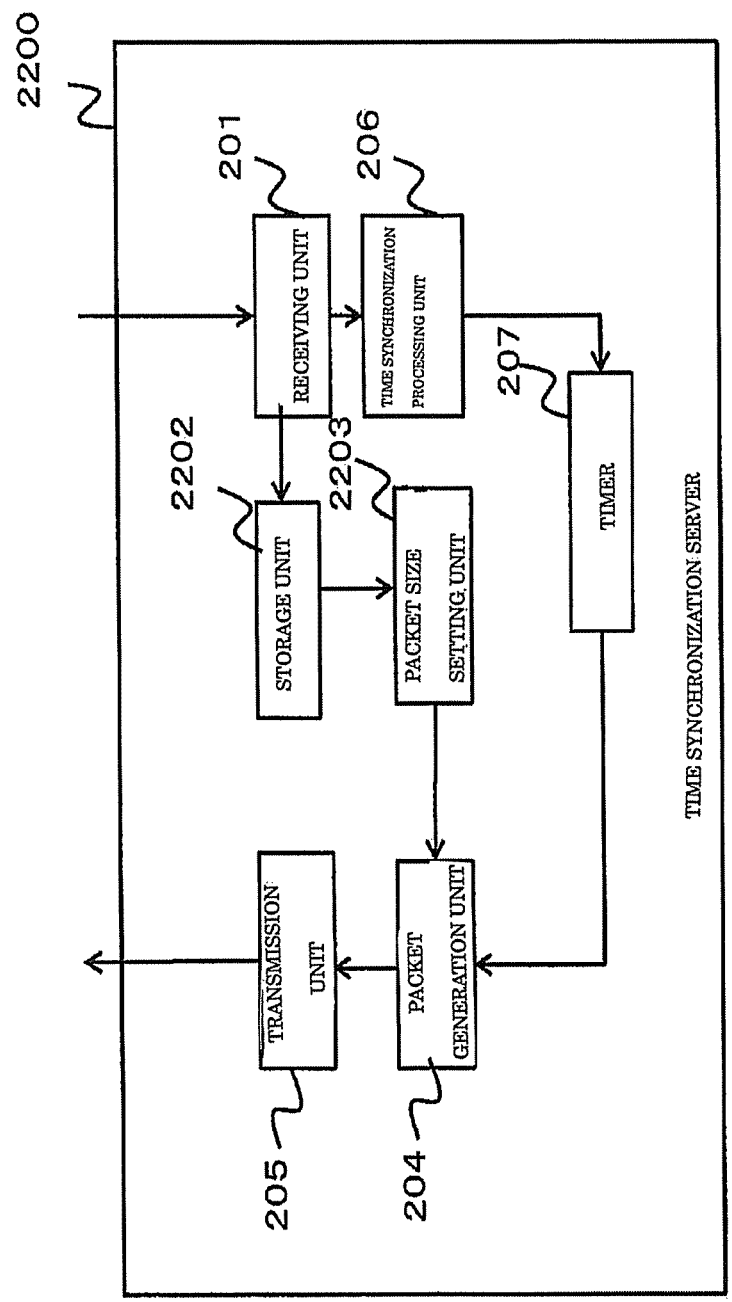
FIG. 7 is a block diagram of a time synchronization server 2200 according to the second embodiment.

FIG. 6 is a block diagram of the time synchronization client 2100. FIG. 7 is a block diagram of the time synchronization server 2200.

As to the time synchronization client 2100, in comparison with the time synchronization client 100, functions of a storage unit 2102 and a packet size setting unit 2103 are different.

The storage unit 2102 further stores, in addition to a function of the storage unit 102, assignable sizes of the synchronization request packet. Here, for example, the assignable sizes may be arbitrarily determined by a manager of the system. Furthermore, in the communication system of FIG. 1, the assignable sizes may be determined based on non-usage band of link being bottlenecks on the network 500, a transmission interval of the synchronization request packet, and a bit rate thereof.

The packet size setting unit 2103 determines a size of the synchronization request packet by comparing a maximum size of packets flown (transmitted) on a path (the network 500) with a maximum of the assignable sizes of the synchronization request packet. The method for determining the size is explained in detail afterwards.

As to the time synchronization server 2200, in comparison with the time synchronization server 200, functions of a storage unit 2202 and a packet size setting unit 2203 are different. The functions of the storage unit 2202 and the packet size setting unit 2203 are almost same as functions of the storage unit 2102 and the packet size setting unit 2103. Moreover, the time synchronization server 2200 processes not the synchronization request packet but a synchronization reply packet.

Figure 8:
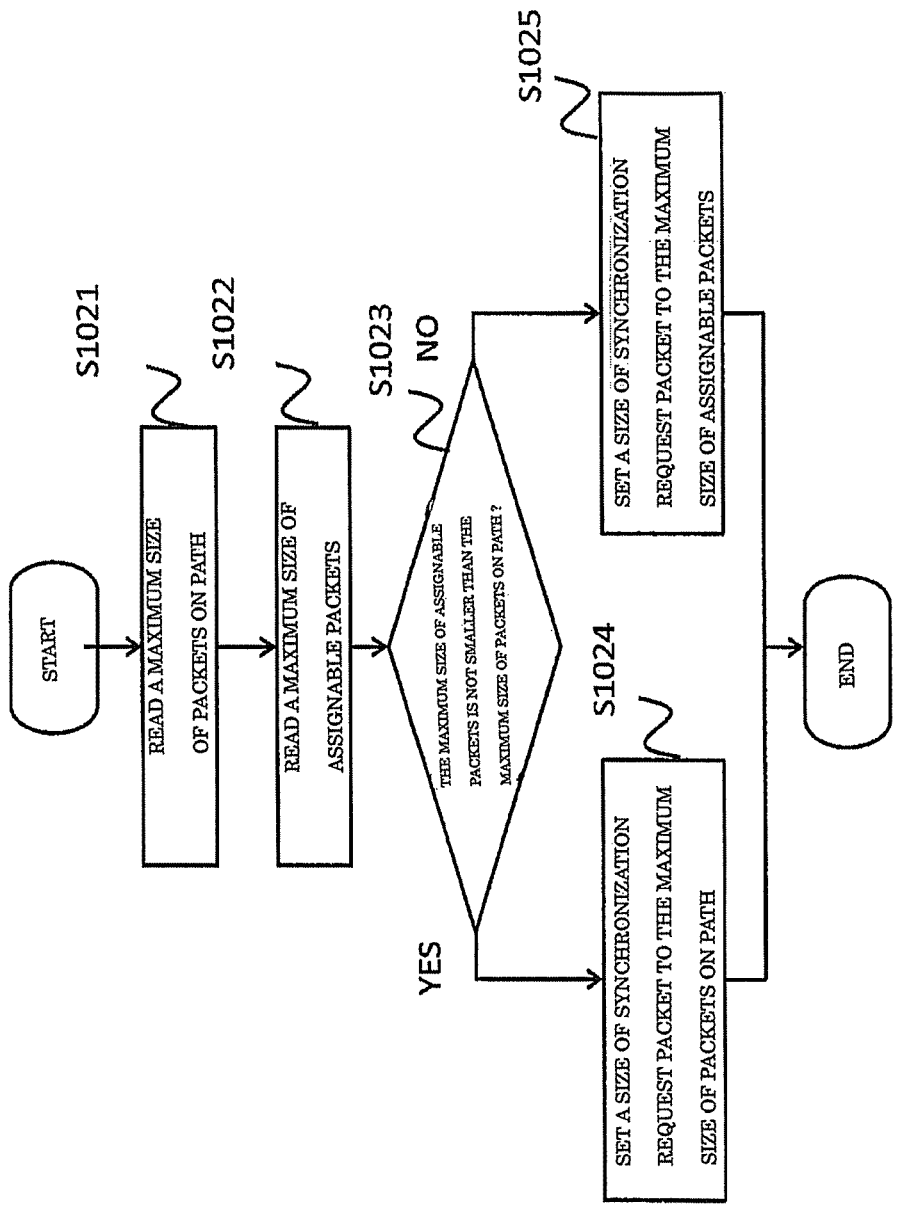
FIG. 8 is a flow chart of processing of the time synchronization client 2100 of FIG. 6.

Next, by referring to FIG. 8, a method for the time synchronization client 2100 to determine a size of the synchronization request packet is explained.

FIG. 8 is a flow chart of the method for the time synchronization client 2100 to determine a size of the synchronization request packet.

First, in the time synchronization client 2100, the packet size setting unit 2103 reads a maximum size of packets flown on the path from the storage unit 2102 (S1021).

Next, the packet size setting unit 2103 reads a maximum of the assignable sizes of the synchronization request packet from the storage unit 2102 (S1022).

Next, the packet size setting unit 2103 compares the maximum size of packets flown on the path with the maximum of the assignable sizes (S1023).

Next, if the maximum of the assignable sizes is not smaller than the maximum size of packets flown on the path, processing is forwarded to S1024. If the maximum of the assignable sizes is smaller than the maximum size of packets flown on the path, processing is forwarded to S1025.

At S1024, the packet size setting unit 2103 sets a size of a synchronization request packet (to be transmitted) to the maximum size of packets flown on the path.

At S1025, the packet size setting unit 2103 sets a size of the synchronization request packet (to be transmitted) to the maximum of the assignable sizes.

Moreover, processing using the synchronization request packet determined by the packet size setting unit 2103 is same as S103~S106 in FIG. 5.

Furthermore, in above-mentioned example, the time synchronization client 2100 determines a size of the synchronization request packet. In the same way as this method, the time synchronization server 2200 can determine a size of the synchronization reply packet.

According to the time synchronization client 2100 and the time synchronization server 2200 of the second embodiment, by approximating a size of the synchronization request packet to a maximum size of packets on the network as much as possible, as understood by the equation (5), an error between a transmission time of the synchronization request packet from the time synchronization client 2100 to the time synchronization server 2200 and a transmission time of the synchronization reply packet from the time synchronization server 2200 to the time synchronization client 2100 can be minimized. Accordingly, one way delay (represented by the equation (2)) can be approximated to an actual transmission time of one way. As a result, the error of time synchronization can be smaller.

<The Third Embodiment>

Next, the third embodiment is explained.

As to a time synchronization client 3100 and a time synchronization server 3200 of the third embodiment, a method for determining each size of a synchronization request packet and a synchronization reply packet is different from the time synchronization client 100 and the time synchronization server 200 of the first embodiment. Other processing thereof is same as the first embodiment.

Component of a communication system of the third embodiment is shown in FIG. 1.

Figure 9:
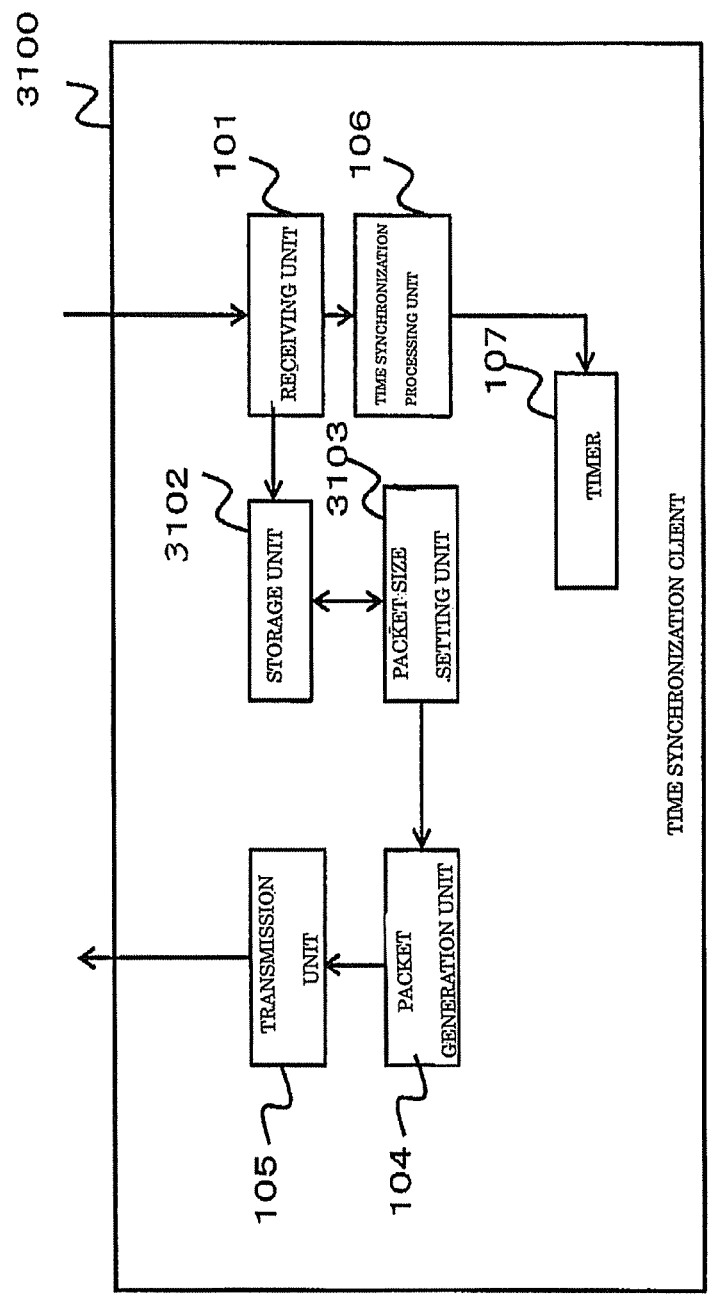
FIG. 9 is a block diagram of a time synchronization client 3100 according to a third embodiment.
Figure 10:
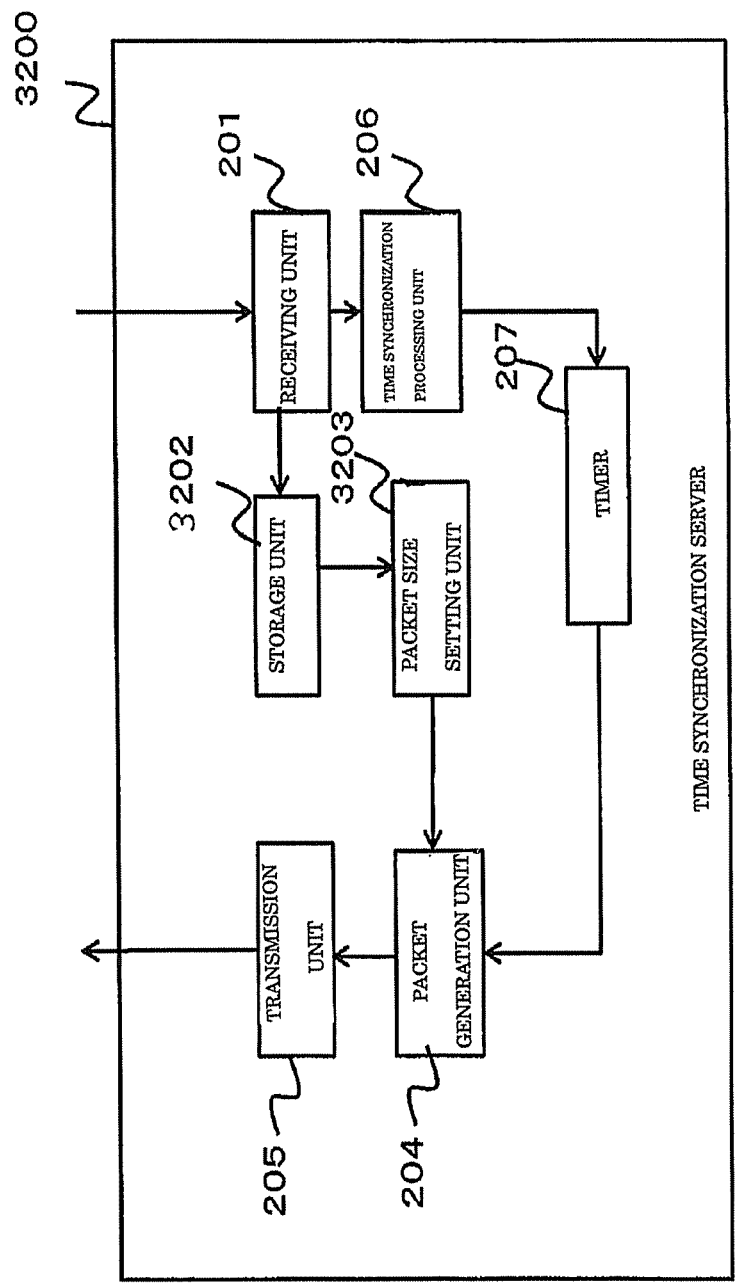
FIG. 10 is a block diagram of a time synchronization server 3200 according to the third embodiment.

FIG. 9 is a block diagram of the time synchronization client 3100. FIG. 10 is a block diagram of the time synchronization server 3200.

As to the time synchronization client 3100, in comparison with the time synchronization client 100, functions of a storage unit 3102 and a packet size setting unit 3103 are different.

The packet size setting unit 3103 calculates a round trip time between the time synchronization client 3100 and the time synchronization server 3200 for each packet multiple times, by transmitting packets each having different size via a transmission unit 105 and by receiving the packets via a receiving unit 101, i.e., by performing transmission/receiving of each packet multiple times. Then, among the packets, a packet of which difference between a maximum time and a minimum time in round trip times of the multiple times is the shortest is selected. A size of this packet is determined as a size of the synchronization request packet. The method for determining is explained in detail afterwards.

As to the time synchronization server 3200, in comparison with the time synchronization server 200, functions of a storage unit 3202 and a packet size setting unit 3203 are different. The functions of the storage unit 3202 and the packet size setting unit 3203 are same as functions of the storage unit 3102 and the packet size setting unit 3103.

Figure 11:
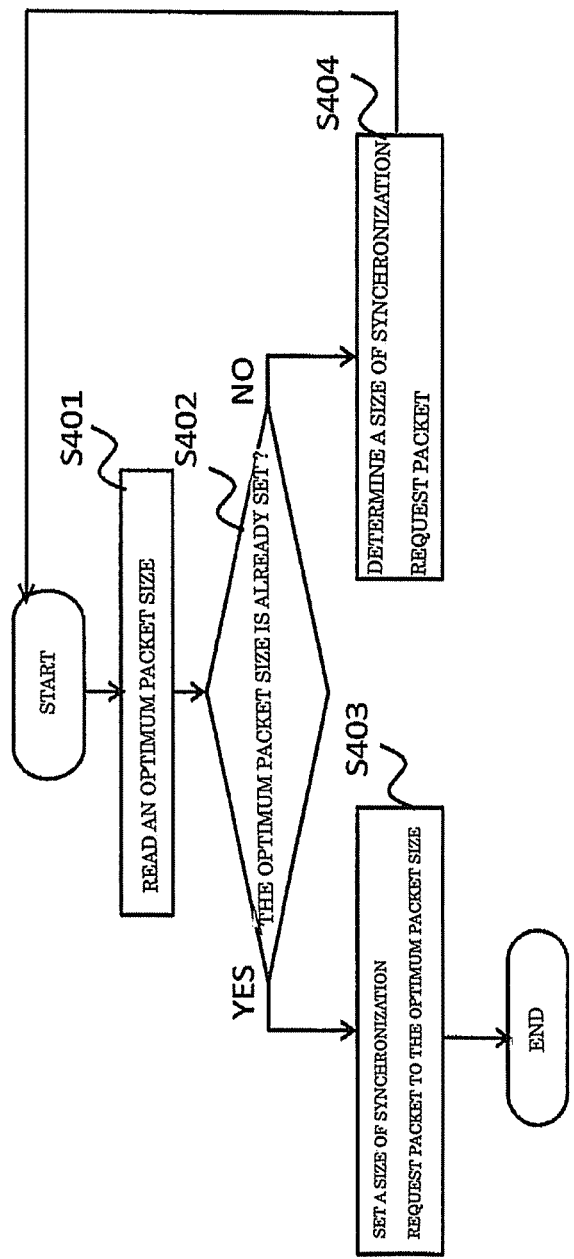
FIG. 11 is a flow chart of processing of the time synchronization client 3100 of FIG. 9.

Next, by referring to FIG. 11, a method for the time synchronization client 3100 to determine a size of the synchronization request packet is explained.

The storage unit 3102 stores an optimum packet size. Detail of the optimum packet size is explained afterwards.

FIG. 11 is a flow chart of the method for the time synchronization client 3100 to determine a size of the synchronization request packet.

First, the packet size setting unit 3103 reads the optimum packet size from the storage unit 3102 (S401). This optimum packet size is not initially set.

Next, the packet size setting unit 3103 decides whether the optimum packet size is already set (S402). If the optimum packet size is already set, processing is forwarded to S403. If the optimum packet size is not set yet, processing is forwarded to S404.

At S404, the packet size setting unit 3103 sets a size of the synchronization request packet to the optimum packet size.

At S405, the packet size setting unit 3103 executes processing to determine the optimum packet size. As the method for determining the optimum packet size, for example, following methods are used.

By transmitting packets each having different size via a transmission unit 105 and by receiving the packets via a receiving unit 101, i.e., by performing transmission/receiving of each packet multiple times, the packet size setting unit 3103 calculates a round trip time between the time synchronization client 3100 and the time synchronization server 3200 for each packet multiple times. Then, among the packets, a packet of which difference between a maximum time and a minimum time in round trip times of the multiple times is the shortest is selected. The round trip time can be calculated as a difference between a time stamp at transmission time and a time stamp at receiving time.

Moreover, as the method for transmitting/receiving each packet (having different size) multiple times, a plurality of methods can be selectively used.

As a first method, by setting an initial value of a size to 0 byte, the size is incremented by 100 byte.

As a second method, by setting an initial value of a size to 0 byte, a next size is set to a half of MTU (Maximum Transmission Unit). Then, by comparing a first packet with a second packet, as to a difference between a maximum time and a minimum time among round trip times of multiple times, if the difference of the second packet is shorter than that of the first packet, a third size is set to three-quarters of MTU. On the other hand, if the difference of the first packet is smaller than that of the second packet, the third size is set to a quarter of MTU. If the third size is a quarter of MTU, by comparing a third packet with a second packet, if the difference of the third packet is smaller than that of the second packet, a fourth size is set to one-eighth of MTU. If the difference of the second packet is smaller than that of the third packet, the fourth size is set to three-eighth of MTU. By repeating this processing, the optimum packet size is determined.

When the optimum packet size is calculated, for example, after repeating trial to search the optimum packet size within a permissible time, a packet size optimal among packet sizes tried is stored as the optimum packet size into the storage unit 3102. After that, decision result at S402 is "YES".

Moreover, processing using the synchronization request packet having the optimum packet size (determined by the packet size setting unit 3103) is same as S103~S106 in FIG. 5.

Furthermore, among packets having different sizes, if at least two packets have the shortest (equal) difference between a maximum time and a minimum time among round trip times of multiple times, the smallest size may be selected from sizes of the at least two packets. As a result, compression of network band can be reduced.

Furthermore, in above-mentioned example, the time synchronization client 3100 determines a size of the synchronization request packet. In the same way as this method, the time synchronization server 3200 can determine a size of the synchronization reply packet.

As to a packet of which variation of the round trip time between the time synchronization client 3100 and the time synchronization server 3200 is small, await time occurred at the network device by packets transmitted from another device 300A~300B is considered to be small. Because, in the system of FIG. 1, a variable affecting variation of the round trip time is the wait time occurred at the network device by packets transmitted from another device 300A~300B.

According to the time synchronization client 3100 and the time synchronization server 3200 of the third embodiment, by setting a size of the synchronization request packet to a size of a packet having the smallest variation of the round trip time, an error between a transmission time of the synchronization request packet from the time synchronization client 3100 to the time synchronization server 3200 and a transmission time of the synchronization reply packet from the time synchronization server 3200 to the time synchronization client 3100 can be minimized. Accordingly, one way delay (represented by the equation (2)) can be approximated to an actual transmission time of one way. As a result, the error of time synchronization can be smaller.

<The Fourth Embodiment>

Next, the fourth embodiment is explained.

Figure 12:
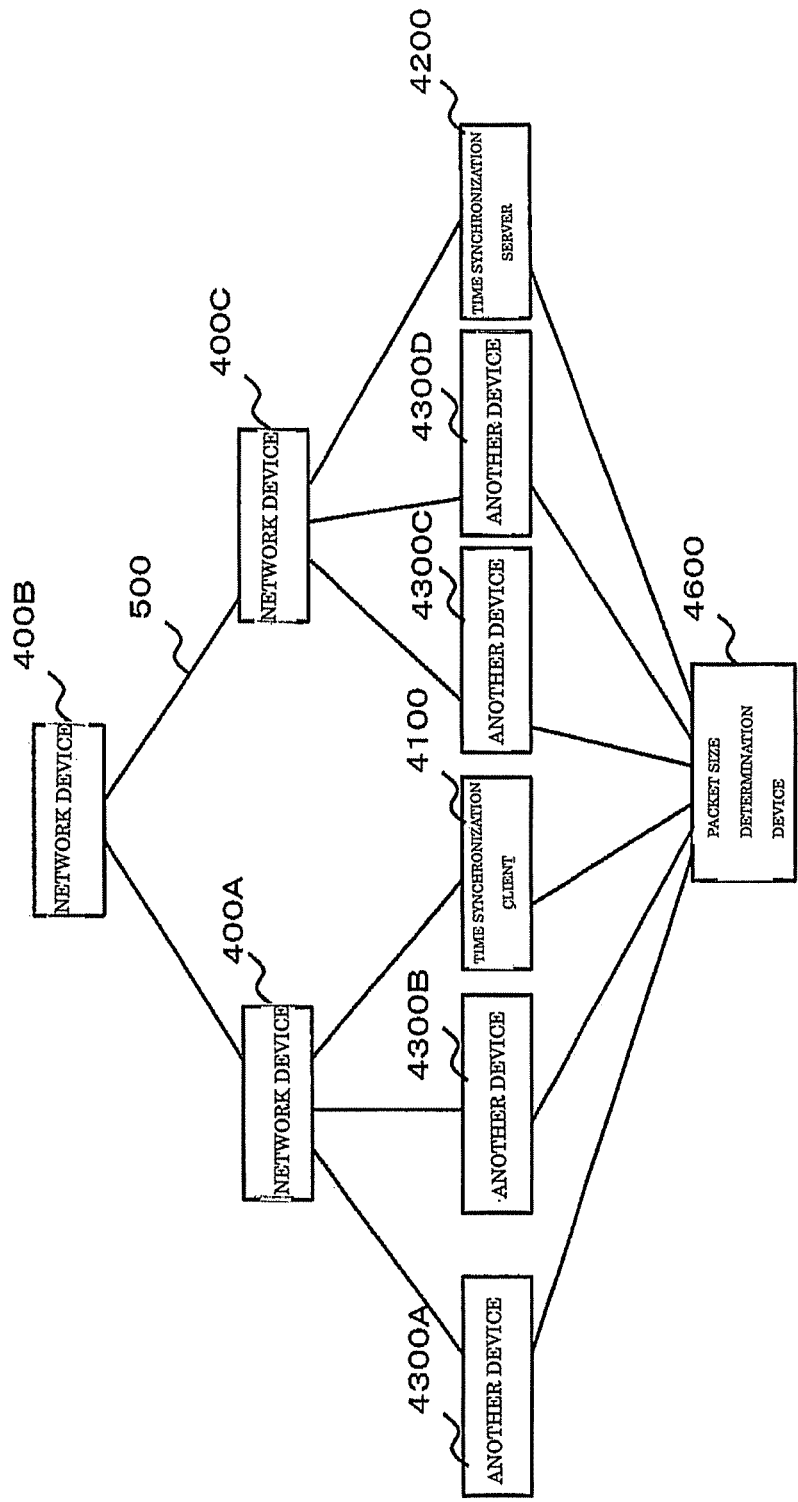
FIG. 12 is a block diagram of a communication system according to a fourth embodiment.

FIG. 12 is a block diagram of a communication system according to the fourth embodiment.

In the communication system of the fourth embodiment, a packet size determination device 4600 controls another device 4300A, 4300B, 4300C and 4300D.

In the first embodiment, the time synchronization client 100 and the time synchronization server 200 determine each size of the synchronization request packet and the synchronization reply packet by matching with a maximum size of packets transmitted from another device 300A~300d. However, in the fourth embodiment, a maximum size of packets transmitted from another device 4300A~4300D is determined by matching with each size of the synchronization request packet and the synchronization reply packet. More specifically, the packet size determination device 4600 determines the maximum size of packets to be transmitted by another device 4300A~4300D, and controls another device 4300A~4300D.

Figure 13:
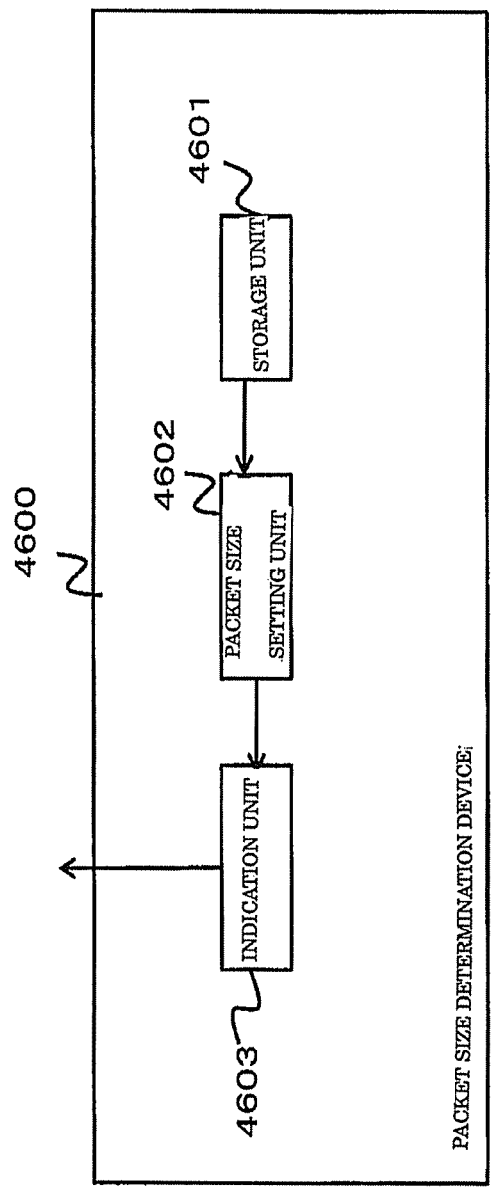
FIG. 13 is a block diagram of a packet size determination device 4600 in FIG. 12.

FIG. 13 is a block diagram of the packet size determination device 4600.

The packet size determination device 4600 includes a storage unit 4601, an indication unit 4603, and a packet size setting unit 4602.

The storage unit 4601 stores a part of information necessary to determine a maximum size of packets transmitted by another device 4300A~4300D. As an example of the information, a size of packets (except for the synchronization request packet and the synchronization reply packet), the number of network devices in the communication system of FIG. 12, a system component among the network device, another device, are stored. Furthermore, the storage unit 4601 may store a condition equation (such as an equation (7) explained afterwards) to determine the maximum size of packets.

The packet size setting unit 4602 determines a maximum size of packets to be transmitted by another device 4300A~4300D. The method for determining the maximum is explained in detail afterwards.

The indication unit 4603 controls another device 4300A~4300D to transmit a packet of which size is not larger than the maximum size determined by the packet size setting unit 4602. According to an indication of the indication unit 4603, another device 4300A~4300D does not transmit a packet of which size is larger than the maximum size.

Different from the time synchronization client 100 and the time synchronization server 200 of the first embodiment, the time synchronization client 4100 and the time synchronization server 4200 of the fourth embodiment respectively transmit a synchronization request packet and a synchronization reply packet each having a predetermined size. In following example, the case that each size of the synchronization request packet and the synchronization reply packet are 100 byte is explained.

Different from another device 300A~300D of the first embodiment, another device 4300A~4300D of the fourth embodiment respectively transmit a packet of which size is not larger than the maximum size determined by the packet size determination device 4600.

Next, a method for the packet size determination device 4600 to determine a maximum size of packets transmitted by another device 4300A~4300D is explained. The maximum size can be determined by the same method as that of the first embodiment.

In the equation (6), by substituting 100 byte (each size of the synchronization request packet and the synchronization reply packet) for L and by calculating M satisfying the equation (6), a maximum size of packets to be transmitted by another device 4300A~4300D can be determined. Briefly, a maximum of M satisfying the equation (6) is the maximum size of packets to be transmitted by another device 4300A~4300D.

The maximum size can be calculated by following equation (7). Assume that M≥100.

$$X < \{M*8/100,000,000 + (M-100)*8/100,000,000\}/2 \quad (7)$$

By calculating M satisfying the equation (7), an error of synchronization time can be within a permissible range.

According to the packet size determination device 4600 and another device 4300A~4300D of the fourth embodiment, a maximum size of packets transmitted by another device 4300A~4300D is determined so that an error between a network delay time of the synchronization request packet from the time synchronization client 100 to the time synchronization server 200 and a network delay time of the synchronization reply packet from the time synchronization server 200 to the time synchronization client 100 is minimized within a predetermined time. Accordingly, one way delay (represented by the equation (2)) can be approximated to an actual transmission time of one way. As a result, the error of the time synchronization can be smaller.

<Modification>

Moreover, in the fourth embodiment, the packet size determination device 4600 determines a maximum size of packets transmitted by another device 4300A~D. However, another device may determine the maximum size.

Figure 14:
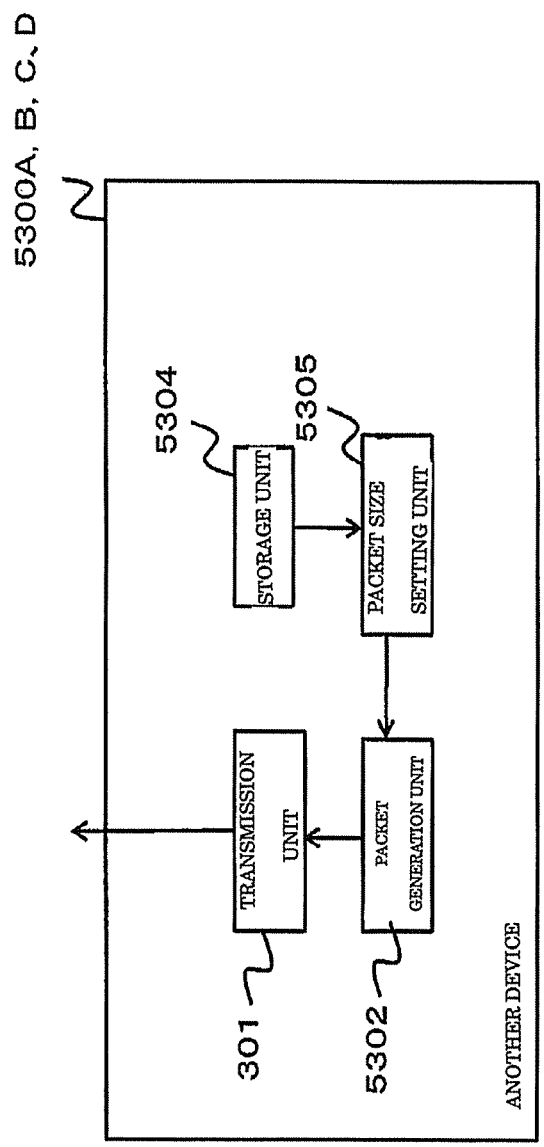
FIG. 14 is a block diagram of another device 5300A, 5300B, 5300C and 5300D according to a modification of the fourth embodiment.

FIG. 14 is a block diagram of another device 5300A~D according to a modification of the fourth embodiment.

Different from another device 300A~D of the first embodiment, another device 5300A~D includes a storage unit 5304 and a packet size setting unit 5305. Hereinafter, a function of another device 5300A is explained.

The storage unit 5304 stores a part of information necessary to determine a maximum size of packets transmitted by another device 5300A. As an example of the information, a size of the synchronization request packet and the synchronization reply packet, the number of network devices in the communication system of FIG. 1, a system component among the network device, another device, and the time synchronization client and the time synchronization server, are stored. Furthermore, the storage unit 5304 may store a condition equation (such as the equation (7)) to determine the size of packets.

The packet size setting unit 5305 determines a maximum size of packets transmitted by another device 5300A~5300D. The maximum size is determined by the same method as that of the packet size determination device 4600 in the fourth embodiment.

The packet generation unit 5302 generates a packet of which size is not larger than the maximum size determined by the packet size setting unit 5305.

Another device 5300B~D respectively have the same function as another device 5300A.

Moreover, another device 5300B~D may not determine the maximum size. In this case, another device 5300B~D generates and transmits a packet of which size is not larger than the maximum size determined by another device 5300A.

According to another device 5300A~D of the modification, the same effect as an effect by the packet size determination device 4600 of the fourth embodiment can be acquired.

Moreover, in the first~fourth embodiments, the example that one way delay is used for time synchronization between the time synchronization client and the time synchronization server is already explained. However, these embodiments can be applied to an example that one way delay is used for another usage. Briefly, applicable range of technique explained in these embodiments is not limited to time synchronization. For example, by measuring one way delay, this technique can be applied to the case of confirming network quality. Briefly, applicable range of this technique can be applied to general usage to calculate one way delay or a round trip time between the server and the client, and to process by using calculated values.

As an effect of at least one of above-mentioned embodiments, based on a round trip time between the client and the server, a transmission time of one way between the client and the server can be preciously calculated.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device for communicating with a first device via a network device, the communication device being a computer executing a program stored, the communication device comprising:
   a setting unit executed by the computer, configured to set a size of a first packet;
   a generation unit executed by the computer, configured to generate the first packet having the size;
   a transmission unit executed by the computer, configured to transmit the first packet to the first device via the network device;
   a receiving unit executed by the computer, configured to receive a second packet from the first device via the network device; and
   a processing unit executed by the computer, configured to calculate a transmission time of the first packet or the second packet between the communication device and the first device, by using a time indicated by the communication device when the transmission unit has transmitted the first packet, a time indicated by the first device when the first device has received the first packet, a time indicated by the first device when the first device has transmitted the second packet, and a time indicated by the communication device when the receiving unit has received the second packet; wherein
   the setting unit sets the size of the first packet so that a wait time of the first packet at the network device is within a predetermined period, and
   the wait time is calculated under the condition that the network device receives a third packet transmitted from a second device before the network device receives the first packet.

2. The communication device according to claim 1, wherein a size of the second packet is equal to the size of the first packet.

3. The communication device according to claim 1, wherein
   the communication device communicates with the first device via a plurality of network devices,
   the setting unit sets the size of the first packet so that a sum of the wait time of the first packet at the plurality of network devices is within a predetermined period, and the wait time is calculated under the condition that the third packet is inputted to the plurality of network devices before the first packet is inputted to the plurality of network devices.

4. The communication device according to claim 3, wherein
the third packet has a maximum size among sizes of packets transmitted on a network connecting the communication device, the network device and the first device.

5. The communication device according to claim 1, wherein
the setting unit calculates the wait time under the condition that the third packet is inputted to the network device just before the first packet is inputted to the network device.

6. The communication device according to claim 5, wherein
the setting unit sets the size of the first packet not larger than a maximum size of packets transmitted on a network connecting the communication device, the network device and the first device.

7. The communication device according to claim 6, wherein,
if the size of the first packet is not larger than a size of the third packet,
and if the size of the first packet is larger, the wait time is shorter.

8. The communication device according to claim 7, wherein
the first device comprises a first timer to tick a reference time,
the communication device further comprises a second timer to tick a time,
the second packet includes a first time as the reference time ticked by the first timer when the first device has transmitted the second packet, and
the processing unit corrects the time ticked by the second timer, based on the transmission time and the first time.

9. A communication device for communicating with a first device via a network device, the communication device being a computer executing a program stored, the communication device comprising:
a receiving unit executed by the computer, configured to receive a first packet from the first device via the network device;
a setting unit executed by the computer, configured to set a size of a second packet;
a generation unit executed by the computer, configured to generate the second packet having the size;
a transmission unit executed by the computer, configured to transmit the second packet to the first device via the network device; and
a processing unit executed by the computer, configured to calculate a transmission time of the first packet or the second packet between the communication device and the first device, by using a time indicated by the first device when the first device has transmitted the first packet, a time indicated by the communication device when the receiving unit has received the first packet, a time indicated by the communication device when the transmission unit has transmitted the second packet, and a time indicated by the first device when the first device has received the second packet;
wherein
the setting unit sets the size of the second packet so that a wait time of the second packet at the network device is within a predetermined period, and the wait time is calculated under the condition that the network device receives a third packet transmitted from a second device before the network device receives the second packet.

10. The communication device according to claim 9, wherein
a size of the first packet is equal to the size of the second packet.

11. A communication device for communicating with a first device via a network device, the communication device being a computer executing a program stored, the communication device comprising:
a setting unit executed by the computer, configured to set a size of a first packet;
a generation unit executed by the computer, configured to generate the first packet having the size;
a transmission unit executed by the computer, configured to transmit the first packet to the first device via the network device;
a receiving unit executed by the computer, configured to receive the first packet from the first device via the network device; and
a processing unit executed by the computer, configured to calculate a transmission time of the first packet between the communication device and the first device, by using a time indicated by the communication device when the transmission unit has transmitted the first packet, a time indicated by the first device when the first device has received the first packet, a time indicated by the first device when the first device has transmitted the first packet, and a time indicated by the communication device when the receiving unit has received the first packet;
wherein the setting unit
calculates a round trip time of each of measurement packets between the communication device and the first device, the measurement packets including the first packet and having different sizes, the round trip time of each measurement packet being calculated multiple times, and
sets a size of a measurement packet, of which difference between a maximum time and a minimum time among round trip times of the multiple times is the shortest among the measurement packets, to the size of the first packet.

12. The communication device according to claim 11, wherein,
if each difference of at least two measurement packets are equally the shortest,
the setting unit sets the smallest size among sizes of the at least two measurement packets to the size of the first packet.

13. A communication device for communicating with a first device via a network device, the communication device being a computer executing a program stored, the communication device comprising:
a setting unit executed by the computer, configured to set a size of a first packet;
a generation unit executed by the computer, configured to generate the first packet having the size;
a transmission unit executed by the computer, configured to transmit the first packet to the first device via the network device;
a receiving unit executed by the computer, configured to receive a second packet from the first device via the network device; and a processing unit executed by the computer, configured to calculate a transmission time of the first packet or the second packet between the communication device and the first device, by using a time indicated by the communication device when the transmission unit has transmitted the first packet, a time indicated by the first device when the first device has received the first packet, a time indicated by the first device when the first device has transmitted the second packet, and a time indicated by the communication device when the receiving unit has received the second packet;

wherein the setting unit compares a maximum size of packets transmitted on a network connecting the communication device, the network device and the first device, with an assignable size of packets to the network, if the assignable size is not smaller than the maximum size, sets the maximum size to the size of the first packet, and if the assignable size is smaller than the maximum size, sets the assignable size to the size of the first packet.

14. A control device in a system including a first device and a second device that mutually communicate via a network device, the control device controlling a third device that transmits a first packet to the network device, wherein the second device is a first computer executing a first program stored, and comprises a generation unit executed by the first computer, configured to generate a second packet, a transmission unit executed by the first computer, configured to transmit the second packet to the first device, a receiving unit executed by the first computer, configured to receive a third packet from the first device, and a processing unit executed by the first computer, configured to calculate a transmission time of the second packet or the third packet between the first device and the second device, by using a time indicated by the second device when the transmission unit has transmitted the second packet, a time indicated by the first device when the first device has received the second packet, a time indicated by the first device when the first device has transmitted the third packet, and a time indicated by the second device when the receiving unit has received the third packet, the control device being a second computer executing a second program stored, and comprising:

a setting unit executed by the second computer, configured to set a size of the first packet so that a wait time of the second packet or the third packet at the network device is within a predetermined period;

wherein the wait time is calculated under the condition that the network device receives the first packet before the network device receives the second packet or the third packet.

15. A communication device in a system including a first device and a second device that mutually communicate via a network device, wherein the second device is a first computer executing a first program stored, and comprises a generation unit executed by the first computer, configured to generate a first packet, a transmission unit executed by the first computer, configured to transmit the first packet to the first device, a receiving unit executed by the first computer, configured to receive a second packet from the first device, and a processing unit executed by the first computer, configured to calculate a transmission time of the first packet or the second packet between the first device and the second device, by using a time indicated by the second device when the transmission unit has transmitted the first packet, a time indicated by the first device when the first device has received the first packet, a time indicated by the first device when the first device has transmitted the second packet, and a time indicated by the second device when the receiving unit has received the second packet, the communication device being a third computer executing a third program stored, and comprising:

a setting unit executed by the third computer, configured to set a size of a third packet transmitted from the communication device to the network device so that a wait time of the first packet or the second packet at the network device is within a predetermined period;

wherein the wait time is calculated under the condition that the network device receives the third packet before the network devices receives the first packet or the second packet.

16. A non-transitory computer readable medium for causing a computer to perform a method for controlling a communication device that communicates with a first device via a network device, the method of the communication device comprising:

setting a size of a first packet;

generating the first packet having the size;

transmitting the first packet to the first device via the network device;

receiving a second packet from the first device via the network device; and calculating a transmission time of the first packet or the second packet between the communication device and the first device, by using a time indicated by the communication device when the first packet is transmitted at the transmitting, a time indicated by the first device when the first device has received the first packet, a time indicated by the first device when the first device has transmitted the second packet, and a time indicated by the communication device when the second packet is received at the receiving;

wherein the setting includes setting the size of the first packet so that a wait time of the first packet at the network device is within a predetermined period, and the wait time is calculated under the condition that the network device receives a third packet transmitted from a second device before the network device receives the first packet.

* * * * *